(12) United States Patent
Nakajima

(10) Patent No.: US 6,868,480 B2
(45) Date of Patent: Mar. 15, 2005

(54) REMOVABLE ACTIVE APPLICATION SPECIFIC MEDIUM

(75) Inventor: Satoshi Nakajima, Redmond, WA (US)

(73) Assignee: UI Evolution, Inc., Bellevue, WA (US)

( * ) Notice: Subject to any disclaimer, the term of this patent is extended or adjusted under 35 U.S.C. 154(b) by 649 days.

(21) Appl. No.: 09/967,688

(22) Filed: Sep. 28, 2001

(65) Prior Publication Data

US 2003/0065682 A1 Apr. 3, 2003

(51) Int. Cl.[7] .............................................. G06F 12/14
(52) U.S. Cl. ....................................... 711/115; 463/44
(58) Field of Search ................................ 711/103, 115, 711/164; 463/44

(56) References Cited

U.S. PATENT DOCUMENTS

| | | | |
|---|---|---|---|
| 5,581,768 A | | 12/1996 | Garney et al. ............... 711/208 |
| 5,623,637 A | * | 4/1997 | Jones et al. .................. 711/164 |
| 5,754,817 A | | 5/1998 | Wells et al. ................. 711/208 |
| 5,822,784 A | | 10/1998 | Garney ........................ 718/104 |
| 5,901,303 A | * | 5/1999 | Chew .......................... 711/115 |
| 6,067,559 A | | 5/2000 | Allard et al. |
| 6,192,364 B1 | | 2/2001 | Baclawski |
| 6,212,518 B1 | | 4/2001 | Yoshida et al. |
| 6,457,099 B1 | * | 9/2002 | Gilbert ........................ 711/115 |
| 6,618,789 B1 | * | 9/2003 | Okaue et al. ............... 711/103 |

OTHER PUBLICATIONS

The Critical Eye, Sony Memory Stick, Sep. 14, 2001, copyright 1999–2001, Emru Townsend and Purple Planet Media, web page: http://purpleplanetmedia.com/eye/tech/memstick.shtml.

Howstuffworks, How Flash Memory Works, Sep. 14, 2001, copyright 1998–2001, Howstuffworks, Inc., web pages: http://howstuffworks.lycos.com/flash-memory1.htm http://howstuffworks.lycos.com/flash-memory2.htm http://howstuffworks.lycos.com/flash-memory3.htm.

Tradespeak.com: White Paper Library, Technical Comparison of Floating Gate Reprogrammable Nonvolatile Memories, Sep. 14, 2001, copyright 2000 TradeSpeak.com, web page: http://tradespeak.com/htmldocs/1243.html.

* cited by examiner

Primary Examiner—St. John Courtenay, III
(74) Attorney, Agent, or Firm—Schwabe, Williamson & Wyatt, P.C.

(57) ABSTRACT

A removable medium is equipped with at least a first storage unit, a processor and an interface. The first storage unit includes first programming instructions designed to implement an embedded application. The embedded application is designed to dynamically generate a content in response to a hosting computing device accessing the removable medium to retrieve the content. The processor is coupled to the first storage unit to execute the first programming instructions, and the interface facilitates attachment of the removable medium to the host computing device, access of the removable medium by the host computing device and return of the content to the host computing device.

26 Claims, 4 Drawing Sheets

REMOVABLE ACTIVE APPLICATION SPECIFIC MEDIUM

BACKGROUND OF THE INVENTION

1. Field of the Invention

The present invention relates to the field of digital data processing. More specifically, the present invention relates to the protection of distributed digital content through contained dynamic generation of requested contents within the removable medium.

2. Background Information

Protection of digital contents[1] from misuse and misappropriation is a subject of paramount interest to the content creators, as it has direct impact on the content creators' economic interest. The subject matter is also of interest to manufacturers of content rendering equipment, such as manufacturers of computing equipment, as content rendering equipment manufacturers also suffer, if insufficient economic incentives exist to induce creation of content for consumption on the content rendering equipment. As a result, a substantial body of content protection techniques has been developed, and is known in the art. Examples such content protection techniques include but are not limited to the wide array of encryption and decryption techniques.

However, many of these techniques, while robust, are costly, and in particular, unsuitable for certain contents or applications, e.g. contents or applications that are of relatively lower economic values, but nevertheless desire protection from misuse and misappropriation, such as gaming software. Thus, alternative approaches that are more cost effective in protecting certain types of digital contents are desirable.

In particular, notwithstanding the advance of the Internet arid the shift towards online distribution of digital contents, a substantial body of these digital contents, such as gaming software, remains being distributed through removable storage medium[2]. Thus, alternative more cost effective approaches that accord higher protection to digital content distributed through removable storage medium are particularly desired.

Notes:

(1) The term digital content as used in the present application, including the claims, includes executable as well as non-executable digital contents of all form, such as video, audio, games and the like.

(2) Examples of removable storage medium through which digital contents are distributed include but are not limited to CD, DVD, EEPROM based storage devices, such as PCMCIA cards, Smart Cards, and Compact Flash.

| Glossary | |
|---|---|
| CISC | Complex Instruction Set Computer |
| CD | Compact Disk |
| DSL | Digital Subscriber Line |
| DVD | Digital Versatile Disk |
| EEPROM | Electrically Eraseable Programmable Read Only Memory |
| HTTP | Hypertext Transmission Protocol |
| ISDN | Integrated Service Digital Network |
| PCMCIA | Personal Computer Memory Card International Association |
| PDA | Personal Digital Assistant |
| RISC | Reduced Instruction Set Computer |
| TCP/IP | Transmission Control Protocol/Internet Protocol |
| URL | Uniform Resource Locator |
| WAP | Wireless Access Protocol |
| WML | Wireless Mark-Up Language |

SUMMARY OF THE INVENTION

A removable medium is equipped with at least a first storage unit, a processor and an interface. The first storage unit includes first programming instructions designed to implement an embedded application. The embedded application is designed to dynamically generate content in response to a hosting computing device accessing the removable medium to retrieve the content. The processor is coupled to the first storage unit to execute the first programming instructions, and the interface facilitates attachment of the removable medium to the host computing device, access of the removable medium by the host computing device and return of the content to the host computing device.

In one embodiment, the removable medium further comprises a controller to facilitate inter-operation between a removable medium device driver of the host computing device and the processor of the removable medium, and a second storage unit to store the execution results of the embedded application, including the dynamically generated contents to be returned to the host computing device. The controller also controls the second storage unit. In one embodiment, the controller facilitates the inter-operation and control of the second storage unit in a manner, enabling the present invention to be transparent to the device driver of the host computing device.

In one embodiment, the first storage unit also includes second programming instructions designed to implement a communication protocol emulation service, emulating the operation of a communication protocol service, enabling the embedded application to operate like a content server, except it is local, i.e. co-resident with the host computing device.

In one embodiment, the content is generated in a display cell based form, including one or more display cell definitions defining a number of display cells for a number of display states. The content also includes transition rules governing transitions between the display states. As a result, the number of accesses made by the host computing device against the removable medium may be reduced, which in turn results in reduction in computation and heat dissipation by the removable medium.

In one embodiment, the removable medium includes a body casing encasing the components. The body casing has the form factor of either a PCMCIA card, a typical game cartridge, a 3.5 in diskette, or a selected one of a number of conventional non-volatile memory devices, such as Flash Memory or Memory Stick, for compatibility with existing host computing devices.

In one embodiment, the host computing device is either a wireless mobile phone, a palm sized PDA, a notebook sized computer or a desktop computer.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes a removable active application specific medium having an embedded application protectively executed within medium.

In the following description, various aspects of the present invention will be described. However, the present invention may be practiced with only some or all aspects of the present invention. For purposes of explanation, specific numbers, materials and configurations are set forth in order to provide a thorough understanding of the present invention. However, the present invention may be practiced without the specific details. In other instances, well known features are omitted or simplified in order not to obscure the present invention.

Parts of the description will be presented using terms such as application, system services, file system, communication service, device drivers, and so forth, commonly employed by those skilled in the art to convey the substance of their work to others skilled in the art. Parts of the description will be presented in terms of operations performed by a computing device, using terms such as receiving, forwarding, accessing, returning, and so forth. As well understood by those skilled in the art, these quantities and operations take the form of electrical, magnetic, or optical signals capable of being stored, transferred, combined, and otherwise manipulated through mechanical, electrical and/or optical components of a digital system.

Further, various operations will be described in turn in a manner that is most helpful in understanding the present invention. However, the order of description should not be construed as to imply that these operations are necessarily order dependent. In particular, the operations need not be practiced in accordance with the order the operations are described. The phrase "in one embodiment" will be used repeatedly. However, the phrase does not necessarily refer to the same embodiment, although it may. Further, the terms "comprising", "having", "including" and the like are synonymous.

Overview

Figure 1:
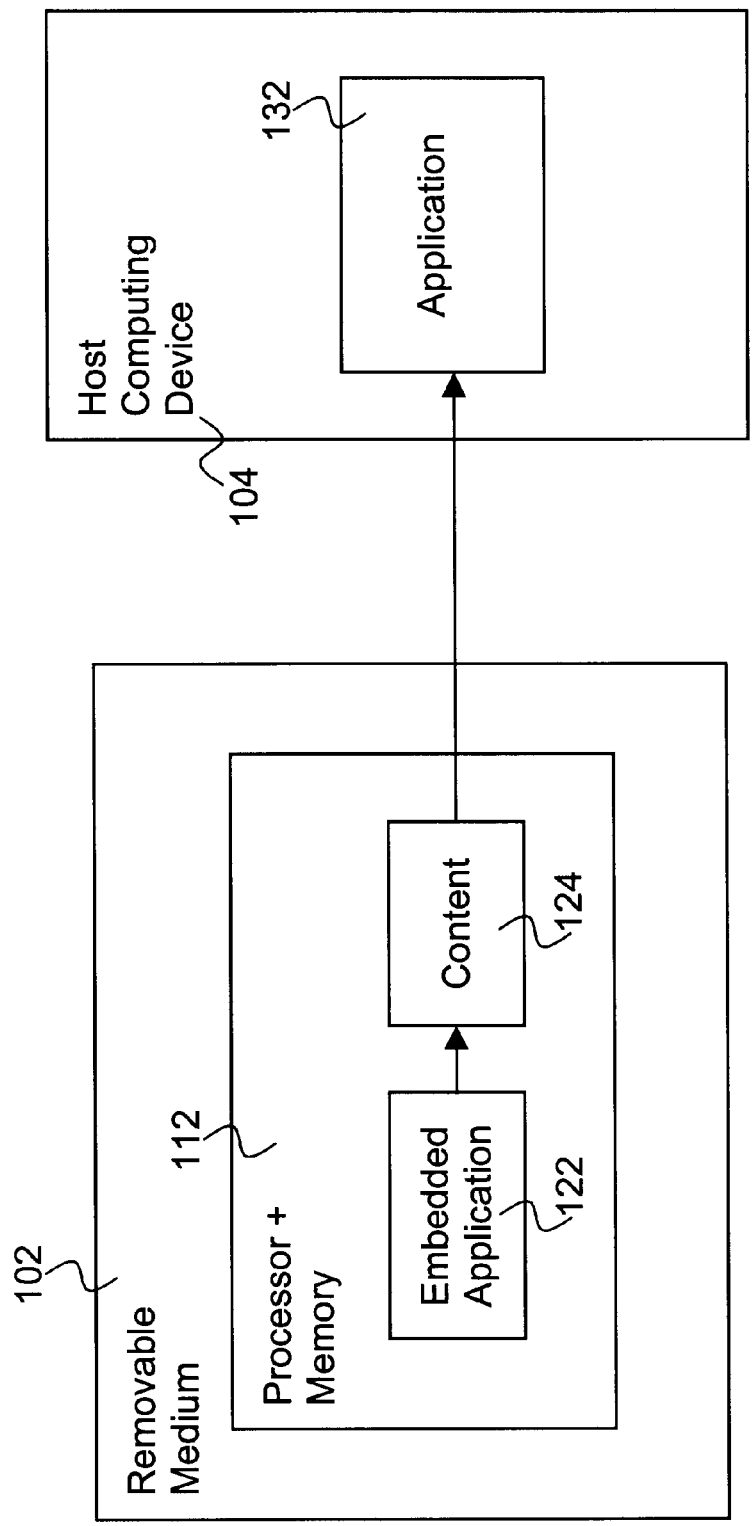
FIG. 1 illustrates an overview of the present invention, in accordance with one embodiment.

Referring now to FIG. 1, wherein a block diagram illustrating an overview of the present invention, in accordance with one embodiment is shown. As illustrated, removable active application specific medium 102 of the present invention comprises processor and memory components 112 and embedded application 122 to provide contents 124 for applications of a host computing device, such as applications 132 of host computing device 104, to which medium 102 is illustrated as being removably attached. In accordance with the present invention, contents 124 are advantageously generated dynamically, when application 132 requests for contents 124, i.e. when host computing device 104 accesses removable medium 102 for contents 124. Further, the generation operations are performed within removable medium 102 without exposing embedded applications 132, thereby providing increased protection to the intellectual property behind contents 124.

Further, as will be appreciated by those skill in the art, the present invention also renders the embedded application less vulnerable to virus or other forms of malicious attacks. The present invention also rendered the embedded application portable across a multiplicity of platforms, so long the interfacing protocol is supported.

As will be described in more detail below, in one embodiment, the access for contents 124 may be made in a conventional manner, thereby rendering the present invention transparent to application 132 and host computing device 104. In other words, the benefits of the present invention may be enjoyed by application 132 and host computing device 104, without requiring or requiring little modifications to application 132 and/or host computing device 104.

Example Host Computing Device

Figure 2:
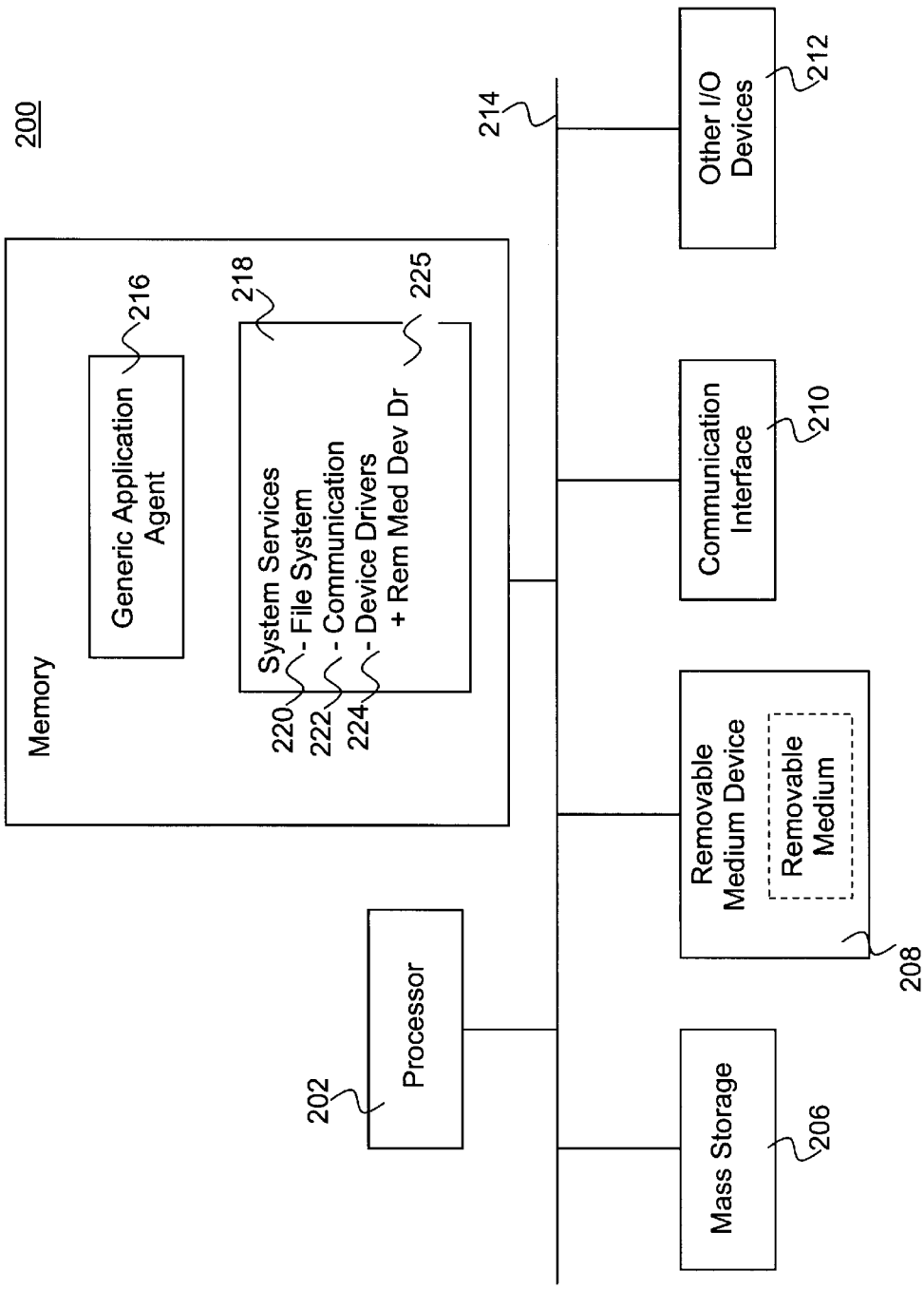
FIG. 2 illustrates an architectural view of an example computing device, suitable for practicing the present invention, in accordance with one embodiment.

FIG. 2 illustrates an example host computing device suitable for use to practice the present invention, in accordance with one embodiment. As shown, for the embodiment, host computing device 200 includes general purpose processor 202 and system memory 204. Additionally, host computing device 200 includes mass storage device 206, removable medium device 208, communication interface 210 and other I/O devices 212. The elements are coupled to each other via a system bus 214, which represents one or more buses. In the case of multiple buses, they are bridged by one or more bus bridges (not shown).

Processor 202 may be any one of a number of processors known in the art, including but not limited to 16-bit, 32-bit or 64-bit RISC or CISC processors. The type of processor employed is typically dependent on the intended usage of example host computing device 200. For example, if host computing device 200 is used as a wireless mobile telephone or a palm sized personal digital assistant, typically a relatively lower performance processor is used. On the other hand, if used as a notebook computer or a desktop computer, typically a relatively higher performance processor is used.

Similarly, memory 204 may be any one of a number of randomly accessible memory devices known in art, in any one of a number of sizes, depending on the intended usage of host computing device 200 as described earlier. Mass storage 206 may be any one of a number of mass storages known in the art, including but are not limited to disk drives, CD and DVD drives. For various embodiments, removable medium device 208 may be any conventional removable passive storage medium device known in the art or a removable storage medium specifically designed for removable active application specific medium 102 of the present invention (e.g. with increased heat dissipation capability). Accordingly, for various embodiments, removable medium 209 may be a conventional removable medium or an implementation of removable active application specific medium 102 of the present invention.

In the context of the present invention, conventional removable storage medium are referred to as passive removable medium, in that their contents are static, and the contents are passively outputted responsive to access by a host computing device. In contrast, the removable medium of the present invention is active in that the contents provided to a host computing device is dynamically generated when the contents are accessed, to be described more fully below.

Likewise, communication interface 210 may be any one of a variety of communication interfaces, including but are not limited to modem interfaces, ISDN interfaces, DSL interfaces and networking interfaces. Other I/O devices 212 may include keyboards, cursor control devices and the like.

Each of these elements performs its conventional functions known in the art. In particular, for the embodiment, system memory 204 is employed to store, during operation, programming instructions implementing generic application agent 216 (such as a browser), and system services 218. Among system services 218 provided, are conventional file system services 220, communication system services 222 (such as TCP/IP services), and device drivers 224, including in particular, a device driver 225 for removable medium device 208.

Thus, as in most conventional host computing device, during operation, when a user of generic application agent 216 requests for a content (e.g. in the case of a browser, specifying the requested content by its URL in accordance with HTTP), generic application agent 216 forwards the request to the file system service 220 (as opposed to the communication services 222), upon discerning that the requested content is located on a local device. Upon receipt of the request, file system service 220 maps the request to a plurality of storage locations of the storage device on which the content is stored (e.g. the content storing cylinders and tracks of the attached removable medium), and forwards the request along with the storage location information to the storage device's device driver 224 to retrieve the content from the identified storage locations of the storage device.

In other words, if the storage device on which the content is located is determined to be the current attached removable medium, file system service 220 forwards the request along with the storage location information to the removable medium storage device's device driver 225 to retrieve the content from the identified storage locations of the removable medium.

In the event the current attached removable medium is an implementation of removable active application specific medium 102 of the present invention, for the embodiment, file system service 220 and device driver 225 nevertheless operate in the same manner, as for the embodiment, the fact that the requested content is dynamically generated is advantageously shielded from these components, in accordance with the present invention, to be described more fully below.

Note that in the case of removable active application specific medium 102 of the present invention, the "locations" do not actually exist. Accordingly, they are "pseudo" locations, and the pseudo locations merely appear to exist (much like virtual memory locations) from the perspective of file system service 220 and device driver 225 for transparency purpose.

However, as alluded to earlier, in alternate embodiments, removable active application specific medium 102 of the present invention may nevertheless be used on a host computing device where at least one of file system service 220 and device driver 225 is cognizant of the fact that the requested content is dynamically generated by removable active application specific medium 102 of the present invention.

Removable Active Application Specific Medium

Figure 3:
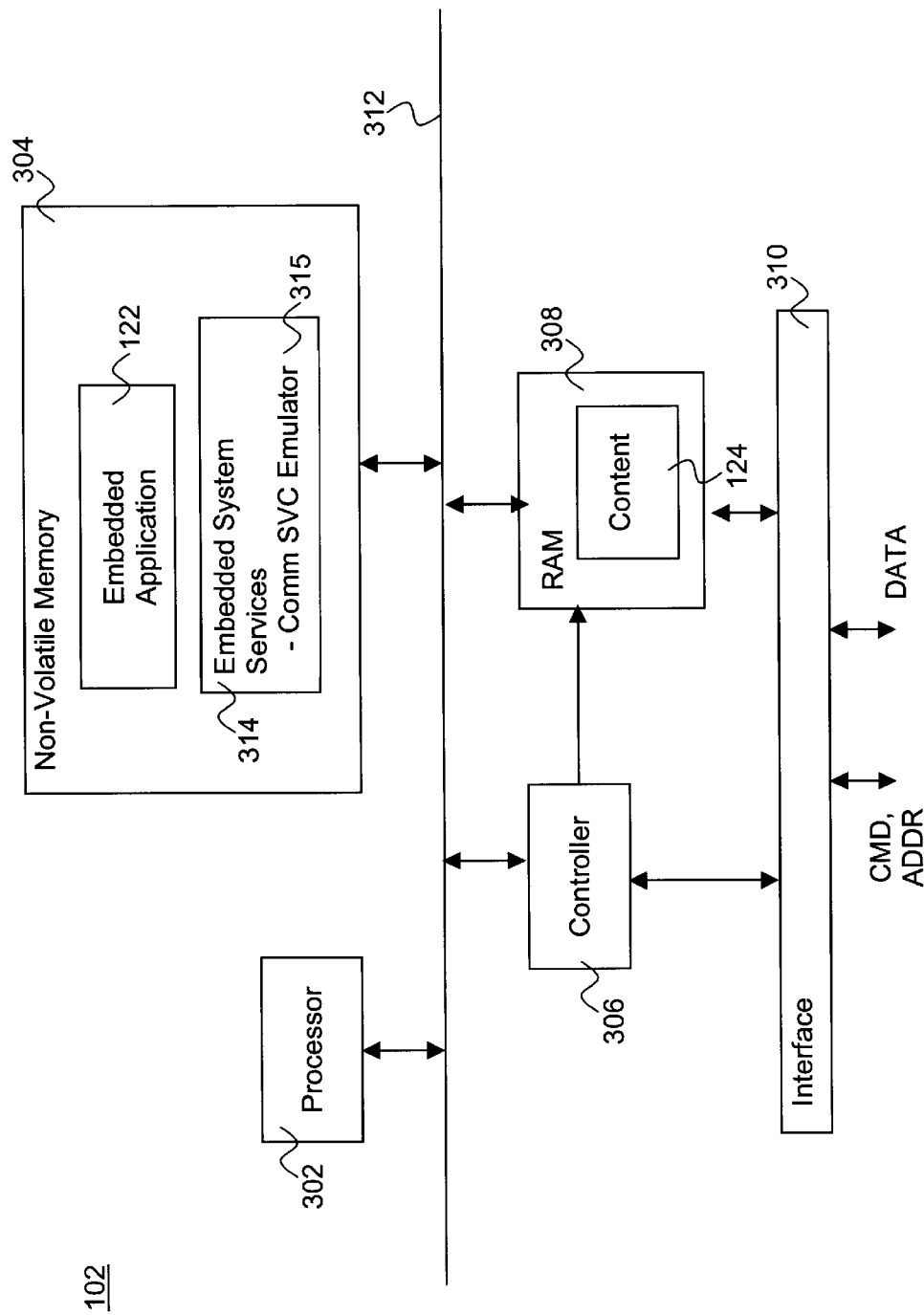
FIG. 3 illustrates the removable active application specific medium of the present invention in further detail, in accordance with one embodiment.

FIG. 3 illustrates removable active application specific medium 102 of the present invention in further details, in accordance with one embodiment. As illustrated, for the embodiment, removable active application specific medium 102 comprises processor 302, non-volatile memory 304, controller 306, volatile memory 308, interface 310 and bus 312. Non-volatile memory 304 includes embedded application 122, and for the embodiment, embedded system services 314. In one embodiment, embedded system services 314 includes in particular, a communication service emulator 315. The elements are physically or operatively coupled to each other as shown.

Processor 302, non-volatile memory 304, volatile memory 308 and bus 312 perform their respective conventional functions known in the art. Interface 310 is employed to facilitate removable coupling of medium 102 to a host computing device. In particular, interface 310 is employed to facilitate a corresponding device driver of host computing device to access and retrieve dynamically generated contents 124. In various embodiments, the corresponding device driver accesses and retrieves a content in blocks or chunks, e.g. by successively initating a series of data block transfers across interface 310. Controller 306 is employed to receive the accesses made by the corresponding device driver, relay an initial access (e.g. for the first block or chunk of a content) to processor 302, notify the corresponding device driver on when the requested content block/chunk becomes available, and control volatile memory 308 to output the content block/chunk in a coordinated manner.

In one embodiment, processor 302 is a low power 16-bit processor, and non-volatile memory 304 comprises EEPROM. In one embodiment, as alluded to earlier, to further reduce the amount of heat dissipated by processor 302, the amount of execution is advantageously reduced by having embedded application 122 generates contents in the form of multiple display cells. Each display cell is described by a corresponding display cell definition. The display cell definitions also include the display states under which the various display cells are to be conditionally displayed. Further, the display cell definitions include display state transition rules that govern the display state transitions between different display states. Accordingly, the need for generic application agent 216 to access and retrieve content from removable medium is reduced. User interface display consituted with conditionally displayed display cells having associated display states and transitional rules is the subject matter of copending U.S. application Ser. No. 09/661,598, filed on Sep. 14, 2000, having common inventorship with the present application. The copending application is hereby fully incorporated by reference.

In alternate embodiments, other approaches may also be employed to reduce the amount of accesses made by the host computing device. For example, contents 124 may be organized in a form that conforms to the WAP, using WML

Method

Figure 4B:
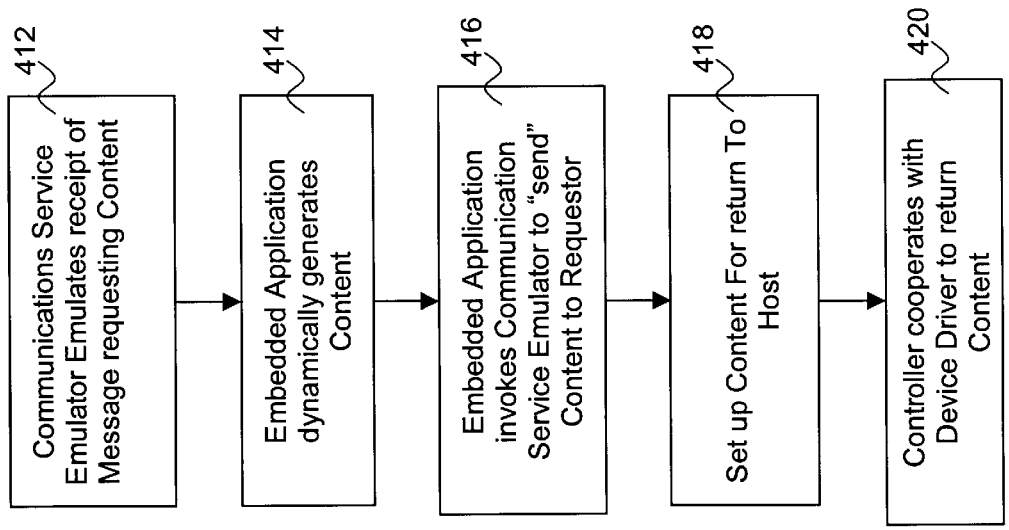
FIGS. 4a–4b illustrate the method of the present invention, including the operational flows of the relevant aspects of the relevant components on both the host computing device and the removable active application specific medium of the present invention.
Figure 4A:
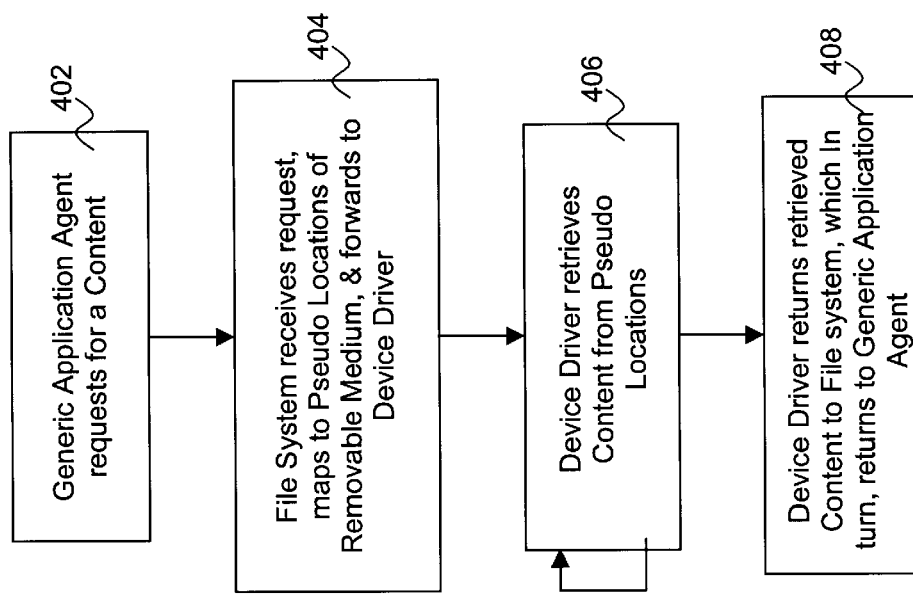

Referring now to FIGS. 4a–4b, wherein two block diagrams illustrating the novel method of the present invention, including the operational flow of the relevant aspects of the relevant components, in accordance with one embodiment, are shown. FIG. 4a illustrates the operations that are performed on host computing device 104, whereas FIG. 4b illustrates the operations performed within the removable active application specific medium 102 of the present invention.

As illustrated in FIG. 4a, at block 402, in response to e.g. a user request, and upon determining that the request is for a content located on a local removable medium, a generic application agent executing on host computing device 104 forwards the request to the file system of host computing device 104. As alluded to earlier, at block 404, the file system of host computing device 104 receives the request, maps the request to (pseudo) locations of the removable medium 102, and forwards the requests along with the (pseduo) locations to the device driver of the removable medium device (on host computing device 104). In response, at block 406, the removable medium device driver on host computing device 104 makes a number of accesses to retrieve the requested content from the (pseudo) locations of removable medium 102.

In one embodiment, upon after each submission for a block or a chunk of the requested content, the removable medium device driver on host computing device 104 repeatedly retries to determine if the requested block/chunk is ready. In another embodiment, upon after each submission, the removable medium device driver on host computing device 104 awaits for a ready notification of the requested block/chunk from removable medium 102 (e.g. provided by the earlier described controller 306 of removable medium 102).

Eventually, upon accumulated all blocks/portions of the requested content, the removable medium device driver on host computing device 104 returns the retrieved content to the file system of host computing device 104, which in turn returns the retrieved content to the generic application agent of host computing device 104. In one embodiment, the content being retrieved is accumulated in a working buffer disposed in the system memory of host computing device 104, and the return of the retrieved content is effectuated through the passing of a pointer to the memory block and a block size.

As illustrated in FIG. 4b, within the removable active application specific medium 102, upon being notified by the controller of removable medium 102 of the request for the first block of a content of interest, for the embodiment, at block 412, the communication service emulator removable medium 102 generates a request message for the content for the embedded application of removable medium 102, emulating the output of a communication service in response to receipt of the request through a communication protocol (such as TCP/IP). In response, at block 414, the embedded application of removable medium 102 dynamically generates the requested content for return to host computing device 104. In one embodiment, the requested content is generated in the volatile memory of removable medium 102. Further, the content is generated in the early described display cell based form.

Upon generating the content, for the embodiment, the embedded application of removable medium 102 invokes the communication service emulator of removable medium 102 to "send" the dynamically generated content to the requester, block 416. In response, the communication service emulator of removable medium 102 notifies the controller of removable medium 102 of the fact that the content is ready for retrieval by the corresponding device driver of the host computing device 104, block 418. In one embodiment, the communication service emulator of removable medium 102 performs the data packaging necessary for the generated content to be retrieved, to enable the embedded application 122 to operate as if it is an application server (except that it is local, co-resident with the hosting computing device 104).

Thereafter, at block 420, the controller of removable medium 102 cooperates with the device driver of host computing device 104, and controls the volatile memory of removable medium 102 to output the various blocks/chunks of the dynamically generated content, to return the content to the generic application agent of the host computing device 102. In alternate embodiments, the embedded application 122 and the controller (or its equivalent) of removable medium 102 may be implemented in such a matter, that allow the controller of removable medium 102 to cooperate with the device driver of host computing device 104 to facilitate the return of the requested content as it is being generated, i.e. as the individual blocks or display cells are created.

As it can be seen from the foregoing description, the instructions employed to generate the contents are advantageously shielded from external observation (outside of removable medium 102). Additionally, for the described embodiment, the removable active application specific medium 102 of the present invention may inter-operate transparently with a conventional host computing device, allowing the benefits of the present invention to be enjoyed without requiring or requiring little modification to the conventional host computing device.

Further, for the embodiment of FIGS. 4a–4b, with the inclusion of an embedded communication service emulator operating as described, embedded application 122 may advantageously operate as an application server, much similar to remote application server known in the art, except it is placed locally co-residing with the host computing device (to which removable medium 102 is attached).

Thus, the present invention advantageously provides the desired added protection to contents distributed through removable medium, with a great degree of compatibility and transparency to existing devices. Further, as alluded to earlier, the present invention renders the embedded application less vulnerable to virus or other type of malicious attacks, as well as rendering the embedded application more portable across of a multiple number of platforms.

Conclusion and Epilogue

Accordingly, a removable active application specific medium that offers improved protection to embedded digital content has been described. While the present invention has been described in terms of the above illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. In a computing device, a method of operation, comprising:
   receiving a request by a generic agent executing on said computing device to retrieve a content from a removable medium currently attached to said computing device;
   accessing said removable medium to retrieve said requested content; and
   in response, dynamically generating by said removable medium said content being accessed, and returning said dynamically generated content to said generic agent.

2. The method of claim 1, wherein said accessing comprises
   a file system of said computing device receiving said request from said generic agent, mapping said request to a plurality of pseudo locations of said removable medium, and forwarding said request including said pseudo location information to a device driver of said computing device; and
   said device driver accessing said removable medium for said content in accordance with said provided pseudo locations.

3. The method of claim 1, wherein said accessing comprises a communication protocol emulation service of said removable medium emulating receipt of a message of said request, and forwarding said message to an embedded application of said removable medium.

4. The method of claim 3, wherein said generating comprises said embedded application dynamically generating said requested content.

5. The method of claim 4, wherein said embedded application generates a display cell definition defining a plurality of display cells of said requested content for a plurality of display states, including transition rules governing transitions between said display states.

6. In a removable application specific medium, a method of operation comprising:
   receiving access of a first plurality of pseudo locations of said removable application specific medium from a host computing device to which said removable application specific medium is attached;
   in response, generating by a communication protocol emulation service for an embedded application a request message requesting a content, emulating receipt of said request message through a communication protocol; and
   generating by said embedded application said content; and
   returning a first portion of said generated content to said host computing device.

7. The method of claim 6, wherein the method further comprises
   receiving access of a second plurality of pseudo locations of said removable application specific medium from said host computing device, said second plurality of pseudo locations being associated with said first plurality of pseudo locations; and
   returning a second portion of said generated content to said host computing device.

8. The method of claim 6, wherein said generating comprises generating a display cell definition defining a plurality of display cells of said content for a plurality of display states, including transition rules governing transitions between said display states.

9. A removable application specific medium comprising:
   first storage unit having stored therein a first plurality of programming instructions designed to implement an embedded application equipped to dynamically generate contents, when executed, responsive to access of said contents by a host computing device to which the medium is attached;
   a processor coupled to the first storage unit to execute the first plurality of programming instruction; and
   an interface coupled to the first storage unit and to the processor to facilitate removable coupling of the medium to the host computing device, and to make available the generated content to said host computing device.

10. The removable medium of claim 9, wherein the storage unit further having stored therein a second plurality of programming instructions designed to implement embedded system services to facilitate said making available of the generated contents to said host computing device.

11. The removable medium of claim 10, wherein the embedded system services comprise embedded communication protocol emulation service to provide emulated communication protocol service.

12. The removable medium of claim 10, wherein the embedded system services comprise an embedded marked up language based content server.

13. The removable medium of claim 9, wherein the execution results of said embedded application comprise content described using a marked up language.

14. The removable medium of claim 9, wherein the medium further comprises a controller coupled to said interface and said processor to facilitate said coupling of said interface to said processor.

15. The removable medium of claim 9, wherein said first storage unit comprises non-volatile storage for storing said first plurality of programming instructions.

16. The removable medium of claim 15, wherein said non-volatile storage comprises EEPROM storage.

17. The removable medium of claim 9, wherein said removable medium further comprises second storage unit for storing execution results of said embedded application.

18. The removable medium of claim 17, wherein said second storage unit comprises volatile storage.

19. The removable medium of claim 18, wherein said volatile storage comprises DRAM.

20. The removable medium of claim 9, wherein said removable medium further comprises a casing body encasing said first storage unit, said processor and said interface, said casing body having a form factor of a PCMCIA card.

21. The removable medium of claim 9, wherein said removable medium further comprises a casing body encasing said first storage unit, said processor and said interface, said casing body having a form factor of a game cartridge.

22. The removable medium of claim 9, wherein said removable medium further comprises a casing body encasing said first storage unit, said processor and said interface, said casing body having a form factor of a non-volatile memory device.

23. The removable medium of claim 9, wherein said host computing device comprises a selected one of a wireless mobile phone, a palm sized personal digital assistant, a notebook size computer and a desktop computer.

24. A removable application specific medium comprising:
   a EEPROM storage unit having stored therein a first plurality of programming instructions designed to implement an embedded application equipped to dynamically generate contents accessed by a host computing device to which the medium is attached, and a second plurality programming instructions designed to implement a communication protocol emulation service to facilitate provision of the generated contents to the host computing device;
   a processor coupled to the EEPROM storage unit to execute the first and second plurality of programming instructions;
   a DRAM storage unit coupled to the processor to store the generated contents;
   an interface coupled to the DRAM storage to facilitate removable coupling of the medium to the host computing device, and to make available the generated contents to said host computing device; and
   a controller coupled to the interface, the processor and the DRAM storage unit to convey access of said contents by said host computing device to said processor, and control of said making available of the generated contents to the host computing device.

25. The removable medium of claim 24, wherein said removable medium further comprises a casing body encasing said first storage unit, said processor and said interface, said casing body having a form factor of a selected one of a PCMCIA card, a game cartridge and a non-volatile memory device.

26. The removable medium of claim 24, wherein said host computing device comprises a selected one of a wireless mobile phone, a palm sized personal digital assistant, a notebook size computer and a desktop computer.

* * * * *

UNITED STATES PATENT AND TRADEMARK OFFICE
CERTIFICATE OF CORRECTION

PATENT NO.       : 6,868,480 B2
APPLICATION NO.  : 09/967688
DATED            : March 15, 2005
INVENTOR(S)      : Satoshi Nakajima It is certified that error appears in the above-identified patent and that said Letters Patent is hereby corrected as shown below:

Figure 2
Reference number "204" is missing. This should be on top of the "memory" box.
Reference number "209" is missing. This should be pointing to the "removable medium" box.

Column 1
Line 37, "...arid..." should read --...and...--.

Column 7
Lines 64-65, "...host computing device 102..." should read --...host computing device 104...--.

Signed and Sealed this

First Day of May, 2007

JON W. DUDAS
*Director of the United States Patent and Trademark Office*